L. MAYER & E. A. BYE.
GEARING FOR TRACTORS.
APPLICATION FILED FEB. 17, 1916.
1,268,783.
Patented June 4, 1918.
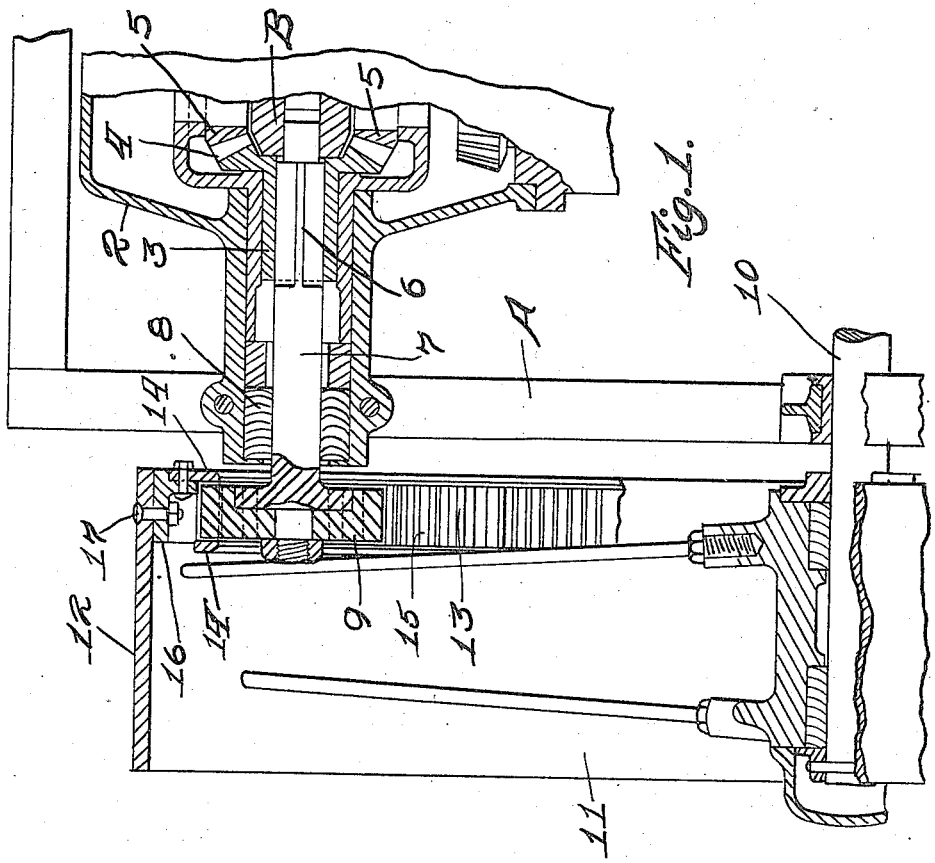
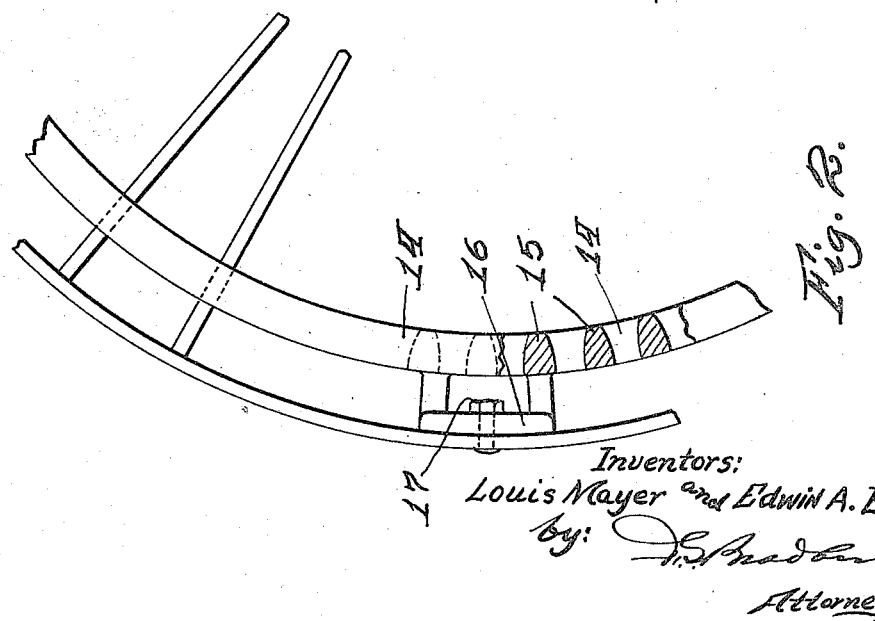
Inventors:
Louis Mayer and Edwin A. Bye.
by: *[signature]*
Attorney.

UNITED STATES PATENT OFFICE.

LOUIS MAYER AND EDWIN A. BYE, OF MANKATO, MINNESOTA, ASSIGNORS TO MAYER BROTHERS COMPANY, OF MANKATO, MINNESOTA, A CORPORATION OF MINNESOTA.

GEARING FOR TRACTORS.

1,268,783.

Specification of Letters Patent.

Patented June 4, 1918.

Application filed February 17, 1916. Serial No. 78,895.

*To all whom it may concern:*

Be it known that we, LOUIS MAYER and EDWIN A. BYE, citizens of the United States, residing at Mankato, in the county of Blue Earth and State of Minnesota, have invented a new and useful Improvement in Gearing for Tractors, of which the following is a specification.

This invention relates to improvements in gearing for tractors, and more particularly pertains to means for transmitting power from a differential gearing and applying the same to the drive wheels. The primary object of this invention is to provide means of the character stated, which will compensate for any motion between the working parts of the mechanism, and which will be self cleaning, so that any earth adhering to the teeth of the gears by which power is directly applied to the wheels will be removed automatically, so that the teeth will not clog and so that the parts will operate efficiently.

Further objects are simplicity of construction and greater effectiveness in use than with prior devices of the class to which this invention relates.

In the drawing, Figure 1 is a sectional detail showing our invention, and Fig. 2 is a side elevation partly in section of a detail of a wheel showing our invention applied thereto.

In the drawing A is a detail of the frame of a tractor on which is mounted a portion of the gear casing 2 containing a portion of a differential gearing B. This differential gearing is journaled in the casing, and one of its driven elements such as the sleeve 3 carrying the gear teeth 4, which mesh with pinions such as 5 forming part of the usual differential mechanism used on a self propelled vehicle is journaled within said casing and slidably connected by feathers 6 or other suitable means with a floating axle 7. This floating axle is journaled by the bearing 8 upon said casing and rigidly and removably carries upon its outer end a drive pinion 9. Suitably mounted upon the frame A is the usual rear axle stub shaft 10 upon which one of the drive wheels 11 is shown journaled. This drive wheel carries upon the inner surface of its rim 12 an internal gear 13, which is in the form of a pair of circular rings or sides 14 having gear teeth 15 spaced apart circumferentially between them. The teeth and rings forming the gear 13 are distanced inwardly from the inner surface of the rim 12 and provided with outwardly projecting flanged couplings 16, which are secured by bolts 17 or other suitable means to the rim. As many coupling elements are provided as may be desired on the internal gear for supporting the latter securely on the rim. The distance between the sides 14 of the internal gear is sufficient to permit the teeth of the pinion 9 meshing freely with the teeth 15. Any lateral movement of the wheel between the wheel and the frame A is compensated by the shaft 7 sliding freely in its supports, and in case any earth or material catches between the teeth 15 of the internal gear, the passages between the teeth allow this earth and material to pass freely outwardly from between them and drop from the space between the internal gear and the rim of the wheel. In this manner the internal gear is self cleaning and the apparatus by the construction set forth is adapted to work efficiently with little likelihood of getting out of order.

In accordance with the patent statutes, we have described the principles of operation of our invention, together with the apparatus which we now consider to represent the best embodiment thereof, but we desire to have it understood that the construction shown is only illustrative, and that the invention can be carried out by other means and applied to uses other than those above set forth within the scope of the following claims.

Having described our invention what we claim as new and desire to protect by Letters Patent is:

1. In combination with a self propelled vehicle having a body frame and a driving wheel revolubly supported thereon having a rim, an internal gear mounted upon and spaced inwardly from said rim having teeth formed with open passages between them connected with the space between said teeth and rim and a revoluble drive shaft freely slidable upon said frame having a pinion, the teeth of which mesh with the teeth of said gear, whereby said pinion is adapted to move freely and compensate for any lateral motion of said gear and wheel.

2. A self propelled vehicle having a body frame, a drive wheel revolubly supported upon said frame having a rim, an internal gear having a pair of laterally spaced parallel rings with gear teeth extending between said rings arranged with open passages between them and coupling elements connected with said rings and holding said gear inwardly spaced from said rim, differential gearing having a gear case mounted upon said frame, a shaft slidably connected with said differential gearing and journaled in case, and a pinion rigidly and removably carried by said shaft on its outer end having teeth in mesh with the teeth of said internal gear, said shaft being adapted by its sliding movement to compensate for lateral movement of said internal gear on said wheel.

3. In a self propelled vehicle having a body frame, a drive wheel revolubly supported upon said frame having a rim, and an internal gear spaced inwardly from said rim having a pair of laterally spaced parallel rings with gear teeth extending between said rings arranged with open passages between them communicating with the space between said gear and rim and coupling elements connected with said rings and holding said gear inwardly spaced from said rim.

In testimony whereof, we have signed our names to this specification.

LOUIS MAYER.
EDWIN A. BYE.

Copies of this patent may be obtained for five cents each, by addressing the "Commissioner of Patents, Washington, D. C."